United States Patent
Hanami et al.

[19]

[11] Patent Number: 6,125,432
[45] Date of Patent: Sep. 26, 2000

[54] IMAGE PROCESS APPARATUS HAVING A STORAGE DEVICE WITH A PLURALITY OF BANKS STORING PIXEL DATA, AND CAPABLE OF PRECHARGING ONE BANK WHILE WRITING TO ANOTHER BANK

[75] Inventors: Atsuo Hanami; Shinichi Nakagawa; Tetsuya Matsumura; Hiroshi Segawa; Kazuya Ishihara; Satoshi Kumaki, all of Hyogo, Japan

[73] Assignee: Mitsubishi Denki Kabushiki Kaisha, Tokyo, Japan

[21] Appl. No.: 08/903,348

[22] Filed: Jul. 30, 1997

Related U.S. Application Data

[63] Continuation of application No. 08/485,911, Jun. 6, 1995, abandoned.

[30] Foreign Application Priority Data

Oct. 21, 1994 [JP] Japan ..................................... 6-257075

[51] Int. Cl.[7] .................................................. G06F 12/02
[52] U.S. Cl. .......................... 711/157; 711/105; 345/515
[58] Field of Search .................................. 711/105, 154, 711/157, 165; 345/507, 515, 511; 365/230.03, 203

[56] References Cited

U.S. PATENT DOCUMENTS

| | | | |
|---|---|---|---|
| 3,995,253 | 11/1976 | Morrin, II et al. | 382/305 |
| 4,924,375 | 5/1990 | Fung et al. | 395/484 |
| 5,129,059 | 7/1992 | Hannah | 395/517 |
| 5,230,064 | 7/1993 | Kuo et al. | 395/162 |
| 5,282,177 | 1/1994 | McLaury | 395/230.05 |
| 5,293,480 | 3/1994 | Miller et al. | 395/163 |
| 5,319,606 | 6/1994 | Bowen et al. | 365/230.06 |
| 5,367,632 | 11/1994 | Bowen et al. | 395/164 |
| 5,404,448 | 4/1995 | Bowen et al. | 395/510 |
| 5,420,608 | 5/1995 | Choi et al. | 345/186 |
| 5,486,876 | 1/1996 | Lew et al. | 348/719 |
| 5,504,855 | 4/1996 | Priem et al. | 395/162 |
| 5,608,888 | 3/1997 | Purcell et al. | 395/412 |
| 5,687,132 | 11/1997 | Rao | 365/230.03 |
| 5,761,694 | 6/1998 | Rao | 711/5 |
| 5,764,963 | 6/1998 | Ware | 345/507 |

FOREIGN PATENT DOCUMENTS

| | | |
|---|---|---|
| 3530178C1 | 12/1986 | Germany . |
| 3728496A1 | 8/1987 | Germany . |
| 1-290047 | 11/1989 | Japan . |
| 5-151771 | 6/1993 | Japan . |
| 5-274864 | 10/1993 | Japan . |

OTHER PUBLICATIONS

German Patent Office Office Action, Jan. 22, 1997, and translation thereof.

Messmer, H.P., *PC–Hardwarebuch;* Addison–Wesley Bonn et al., 2nd edition, 1993, pp. 332–338.

*Primary Examiner*—John W. Cabeca
*Assistant Examiner*—Christopher S. Chow
*Attorney, Agent, or Firm*—McDermott, Will & Emery

[57] ABSTRACT

Screen data consists of two sets of field data. Each set of field data is divided into a plurality of data blocks which has four rows of pixel data corresponding to four rows of pixels vertically arranged. Every data block corresponding to one set of field data is stored in the first bank (bank0) of a frame buffer memory while that corresponding to the other set of field data is stored in the second bank (bank1). One row address is assigned to each data block. Bank1 is precharged while bank0 is in a write operation and vice versa in order to carry out the precharging operation and the write operation concurrently, so that the pixel data can be transferred at a high data transfer rate and each of two sets of field data can be transferred independently.

16 Claims, 13 Drawing Sheets

FIG. 16

| T0 | T1 | T2 | T3 | T4 | T5 | T6 | T7 |
|----|----|----|----|----|----|----|----|
| T8 | T9 | T10 | T11 | T12 | T13 | T14 | T15 |

FIG. 17  PRIOR ART

IMAGE PROCESS APPARATUS HAVING A STORAGE DEVICE WITH A PLURALITY OF BANKS STORING PIXEL DATA, AND CAPABLE OF PRECHARGING ONE BANK WHILE WRITING TO ANOTHER BANK

This application is a continuation of application Ser. No. 08/485,911 filed Jun. 6, 1995, now abandoned.

BACKGROUND OF THE INVENTION

1. Field of the Invention

The present invention relates to an image processing apparatus including a pixel data storage means for storing pixel data representing pixels in a screen and, more particularly, to an image processing apparatus including an image data storage device for storing pixel data to be used in an image decoding process.

2. Description of the Background Art

Efforts have been made to make international standards for the compression and expansion of image data by International Organization for Standardization (ISO), International Telegraph and Telephone Consultative Committee (CCITT, now ITu-T) and international Electric Committee (IEC).

JPEG standard among international standards, made by the joint photographic expert group of ISO and CCITT prescribe an algorithm for the compression and expansion of color still pictures. Meanwhile, MPEG standard is now being drafted by Moving Picture Expert Group of ISO and IEC, and it defines compression and decompression algorithms for color moving images. Further, the H. 261 standard, which is under examination by CCITT, prescribes a compression/expansion algorithm suitable for the video conference system and the visual telephone system.

The JPEG standard, the MPEG standard and the H. 261 standard for an image compressing process include a discrete cosine transformation process, a quantizing process and a Huffman coding process. For example, the JPEG standard for color still picture processing comprises, as basic systems, an adaptive DCT process, a quantizing process and a Huffman coding process. The JPEG standard comprises, as extension systems, an adaptive DCT process, a hierarchical coding process, an arithmetic coding process and an adaptive Huffman coding process. The MPEG standard for moving picture storing process comprises a motion compensation interframe prediction process, a DCT process, a quantizing process and a Huffman coding process. The H. 261 standard for the video conference system and the visual telephone system includes a motion compensation/interframe prediction process, a DCT process, a quantizing process and a Huffman coding process.

Efforts have been made to develop an LSI circuit device for processing images according to those international standards, i.e., an image processing apparatus. A conventional image processing apparatus will be described hereinafter. FIG. 17 is a diagrammatic view of assistance in explaining an operation of the conventional image processing apparatus for addressing a frame buffer memory.

The conventional image processing apparatus is provided with a frame buffer memory to store pixel data to be subjected to the aforesaid processes. The frame buffer memory has thirty-two planes of memory cell arrays. When one row address RA and one column address CA are specified, one bit of data is read from (or written into) each memory cell array. Therefore, when one row address RA and one column address CA are specified, thirty-two bits of data are read from the memory cell arrays. Generally, one pixel is represented by eight bits of data. Therefore, thirty-two bits of data are able to represent four pixels; that is, four pixel data representing four pixels can be handled by specifying one row address RA and one column address CA.

A procedure for addressing the frame buffer memory will be described hereinafter. In FIG. 17, pixel data of sixteen pixels in a column and eight pixels in a row are stored in the frame buffer memory in a frame structure and in data blocks each of four pixels in a column. Referring to FIG. 17, pixel data TFP0 and TFP1 of a top field, and pixel data BFP0 and BFP1 of a bottom field are stored alternately in each of data blocks D0 to D31. Thus, the top field pixel data TFP and the bottom field pixel data BFP are stored in alternate rows, respectively, in the data blocks D0 to D31. The top field pixel data and the bottom field pixel data represents the pixel data of a frame.

One row address and one column address are assigned to each of the data blocks D0 to D31. For example, a row address RA0 and a column address CA0 are assigned to the data block D0. Therefore, when the row address RA0 and the column address CA0 are specified, four pixel data stored in the data block D0 of the frame buffer memory are read or four pixel data are written into the data block D0.

When storing pixel data in the frame buffer memory by the foregoing procedure, the pixel data are transferred by the following procedure First, if frame structure pixel data of eight pixels in a column and eight pixels in a row is necessary when transferring frame structure pixel data, pixel data stored, for example, in the data blocks D0 to D15 are transferred. In this case, since the top field pixel data and the bottom field pixel data are stored in each of the data blocks D0 to D15, only the necessary pixel data can be transferred. On the other hand, if field structure pixel data of, for example, eight pixels in a column and eight pixels in a row is necessary when transferring field structure pixel data, pixel data stored in the data block D0 to D31 must be transferred. Although the field structure pixel data needs only either the pixel data of the top field or the pixel data of the bottom field, unnecessary pixel data needs to be transferred because two pixel data for each of the top field and the bottom field are stored in each data block. Therefore, when transferring field structure pixel data, a quantity of pixel data twice that of necessary pixel data are transferred.

The conventional image processing apparatus needs to transfer a quantity of pixel data twice that of necessary pixel data when transferring field structure pixel data and hence the image processing apparatus is unable to transfer the pixel data at a high data transfer rate. Since the buffer memory to which the pixel data are transferred must store a quantity of pixel data twice that of the necessary pixel data, the buffer memory must have a large storage capacity twice an actually necessary storage capacity.

Furthermore, when writing data at a plurality of different addresses, a plurality of precharging cycles of precharging period is necessary, which requires a long time for transferring data.

SUMMARY OF THE INVENTION

Accordingly, it is an object of the present invention to provide an image processing apparatus capable of transferring pixel data at a high data transfer rate.

Another object of the present invention is to provide an image processing apparatus capable of transferring only pixel data required for image processing.

A further object of the present invention is to provide an image processing apparatus capable of transferring pixel data stored at different row addresses at a high data transfer rate.

An image processing apparatus in a first aspect of the present invention comprises a storage device for storing pixel data representing pixels in a screen. The storage device comprises a plurality of banks for storing pixel data, and a precharging circuit for precharging predetermined banks among the plurality of banks; the screen comprises a field screen; the storage device stores every group of n rows (n is an integer) of pixel data at a different bank among the plurality of banks; one address is assigned to n pixel data; the n rows of pixel data correspond to n rows of pixels arranged along a first direction on the field screen; the n pixel data correspond to n pixels arranged along a second direction crossing the first direction among the n rows of pixels; the precharging circuit precharges one bank while another bank among the plurality of banks is in write operation.

Since every group of n rows of pixel data corresponding to the n rows of pixels arranged along the first direction on the field screen is stored in each of the plurality of banks, one address is assigned to the group of n pixel data corresponding to n pixels arranged along the second direction crossing the first direction among n rows of pixel data, one bank can be precharged by the precharging circuit while another bank is in a write operation. Accordingly, a write operation and a precharging operation can be concurrently carried out, so that pixel data can be transferred at a high data transfer rate.

An image processing apparatus in a second aspect of the present invention comprises a storage device for storing pixel data representing pixels in a screen. The storage device comprises a plurality of banks for storing pixel data, and a precharging circuit for precharging predetermined banks among the plurality of banks, the storage device stores every group of a plurality of rows of pixel data in each bank, one address is assigned to each group of a plurality of pixel data, the plurality of rows of pixel data correspond to a plurality of rows of pixels adjacently arranged along a first direction on the screen, the plurality of pixel data correspond to a plurality of pixels adjacently arranged along a second direction crossing the first direction among the plurality of rows of pixels, the precharging circuit precharges one bank among the plurality of banks while another bank is in write operation.

Every group of the plurality of rows of pixel data corresponding to the plurality of rows of pixels adjacently arranged along the first direction in the screen is stored in each of the plurality of banks, and one address is assigned to the group of the plurality of pixel data corresponding to the plurality of pixels adjacently arranged along the second direction crossing the first direction among the plurality of rows of pixels data Therefore, the precharging circuit is able to precharge one bank while another bank is in a write operation, so that the writing operation and the precharging operation can be concurrently carried out and the field pixel data and the frame pixel data can be transferred at a high data transfer rate.

An image processing apparatus in a third aspect of the present invention comprises a storage device for storing pixel data representing pixels in a screen, the storage device assigns one address to a group of a plurality of pixel data corresponding to a plurality of pixels adjacently arranged along a first direction in a screen, the plurality of pixel data includes a plurality of pixel data corresponding to pixels in a field, and the storage device transfers the pixel data of each field at a time.

Since one address is assigned to the group of a plurality of pixel data in a field, and the plurality of data of each field is transferred at a time, only the pixel data necessary for image processing can be transferred. Accordingly, both the frame structure pixel data and the field structure pixel data can be transferred at a high data transfer rate. Since unnecessary data is not transferred, the storage capacity of the storage device that receives the transferred pixel data may be comparatively small.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a third view of assistance in explaining the third method of addressing the frame buffer memory shown in FIG. 1; and FIG. 17 is a view of assistance in explaining a method of addressing a frame buffer memory included in a conventional image processing apparatus, showing a layout of pixel data.

DESCRIPTION OF THE PREFERRED EMBODIMENTS

An image processing apparatus in a preferred embodiment according to the present invention will be described hereinafter with reference to the accompanying drawings.

Figure 1:
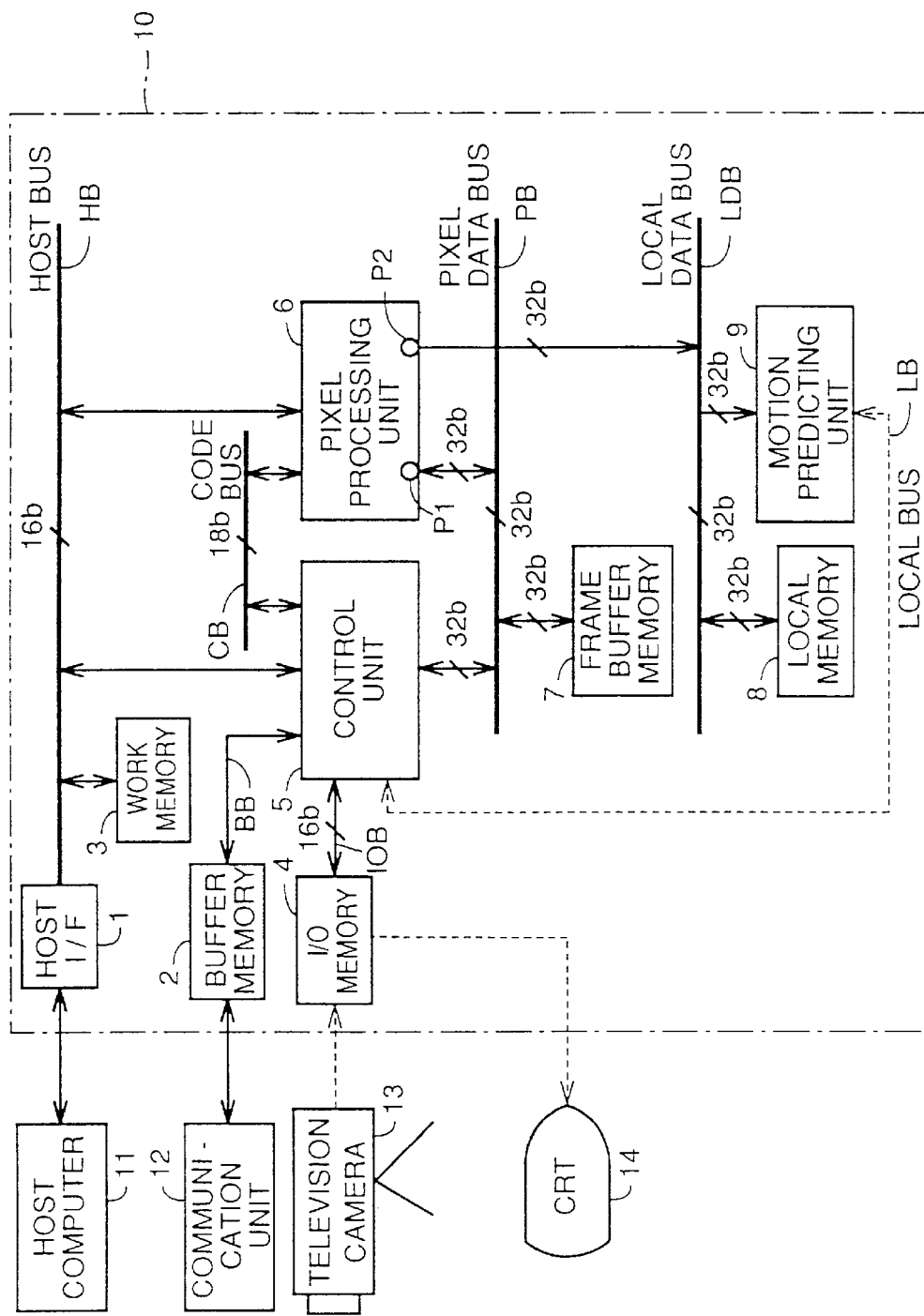
FIG. 1 is a block diagram of an image processing apparatus in a preferred embodiment according to the present invention.

Referring to FIG. 1, an image processing apparatus 10 comprises a host interface circuit (I/F) 1 for interfacing the image processing apparatus 10 with a host computer 11, a control unit 5 provided with two processors, not shown, a pixel processing unit 6 for DCT and quantization, a motion predicting (or detecting) unit 9, a frame buffer memory 7 for storing pixel data to be processed, a buffer memory 2 for storing code data, a work memory 3 for storing table data necessary for various conversion processes, and an I/O memory 4 for storing image data provided by a television camera 13 and/or sending stored image data to a display (CRT) 14.

A host bus HB having a bus width of sixteen bits (as indicated at "16b" in FIG. 1) transfers data between the host interface circuit 1, the control unit 5, the pixel processing unit 6, and the work memory 3. A pixel data bus PB having a bus width of thirty-two bits (as indicated at "32b" in FIG. 1) transfers data between the control unit 5, the pixel processing unit 6 and the frame buffer memory 7. A local data bus LB having a bus width of thirty-two bits transfers data between the pixel processing unit 6, the motion predicting unit 9 and the local memory 8. A code data bus CB having a bus width of eighteen bits (18b) transfers code data between the control unit 5 and the pixel processing unit 6. A buffer memory bus BB having a bit width of sixteen bits transfers data between the control unit 5 and the buffer memory 2. An I/O bus IOB having a bus width of sixteen bits (16b) transfers data between the control unit 5 and the I/O memory 4.

The host interface circuit 1 has a logic circuit comprising a general-purpose logic LSI circuit (discrete) or a programmable logic device, such as a PLD or an FPGA. The frame buffer memory 7, the principal function of which is to temporarily store pixel data to be compressed and reference pixel data, is a large-capacity memory, such as an SRAM (Static Random Access Memory), a DRAM (Dynamic Random Access Memory), a synchronous DRAM or a cache DRAM.

The buffer memory 2 stores temporarily bit stream data obtained by coding an image. The buffer memory 2 is an FIFO (First-In First-Out) memory.

The work memory 3 stores DCT/inverse DCT table data, quantized/inverse quantized table data, Huffman table data for a variable-length process, programs (microcodes) defining the operations of the control unit 5 and the pixel processing unit 6, and initialization data. The work memory is an SRAM.

The I/O memory 4 stores image data for the television camera 13 and/or the display 14. The I/O memory 4 is a video RAM or may be a DRAM or an SRAM.

The control unit 5 comprises a microprocessor, not shown, for controlling general operations, and a processor, not shown, for controlling variable-length processing. The microprocessor for controlling general operations controls a pipeline process for DCT for image compression, quantization and variable-length coding, and a pipeline process for variable-length coding for image expansion, inverse quantization and inverse DCT.

The pixel processing unit 6 executes arithmetic operations for processing pixels, such as DCT and quantization for compressing an image, and inverse quantization and inverse DCT for expanding an image.

The motion predicting unit 9 executes motion detecting processes for unidirectional and bidirectional interframe prediction.

The image processing apparatus 10 thus constructed receives bit stream data from and sends out bit stream data to an external communication unit 12 through the buffer memory 2. The buffer memory 2 stores temporarily bit stream data obtained by coding pixel data by the variable-length processor, not shown, included in the control unit 5. Therefore, only the bit stream data can be transferred without relying on the host computer 11, which enhances data transfer rate.

The host computer 11 needs to perform complex operations including command control operations other than data transfer operations and is heavily loaded. Therefore, data transfer between the external communication unit 12 and the buffer memory 2 without relying on the host computer 11 reduces load on the host computer and enables data transfer at a high data transfer rate.

Figure 2:
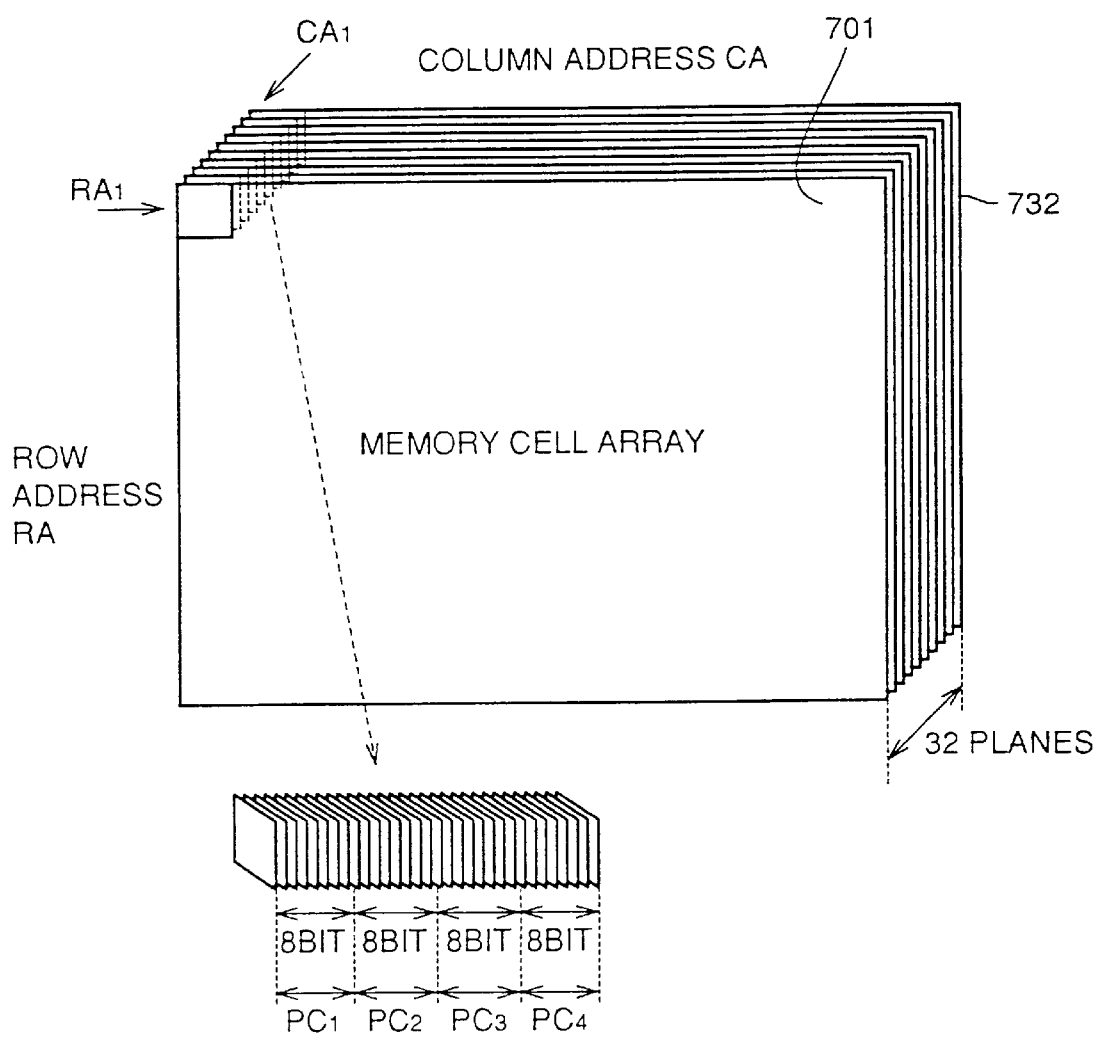
FIG. 2 is a typical view of the memory cell arrays of a frame buffer memory included in the image processing apparatus of FIG. 1.

The frame buffer memory 7 included in the image processing unit 10 shown in FIG. 1 will be described in detail with reference to FIG. 2 showing the basic configuration of the memory cell arrays of the frame buffer memory 7.

Referring to FIG. 2, the frame buffer memory 7 has thirty-two planes of memory cell arrays 701 to 732. When one row address RA and one column address CA are specified, one bit of data is read from (or written in) each of the memory cell arrays 701 to 732. For example, when a row address RA1 and a column address CA1 are specified, thirty-two bits of data are read from the memory cell arrays 701 to 732.

Generally, eight bits of data are necessary for representing one pixel. Therefore, pixel data representing four pixels PC1 to PC4 can be handled by the thirty-two bits of data.

Figure 3:
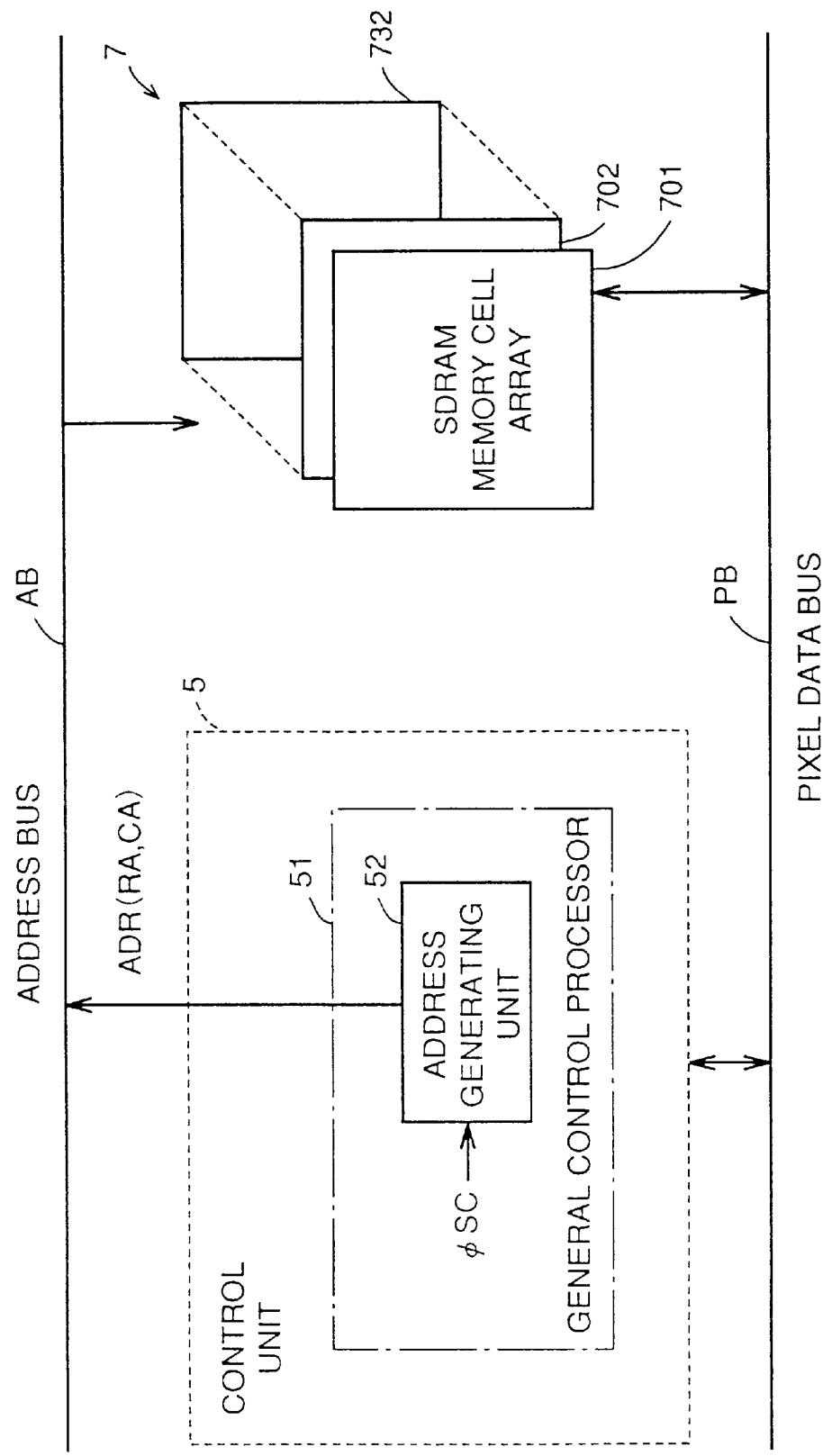
FIG. 3 illustrates, in a block diagram, the configuration of a frame buffer memory employing a synchronous DRAM.

A system including a synchronous DRAM as the frame buffer memory 7 as shown in FIG. 3 will be described.

Referring to FIG. 3, the frame buffer memory 7 comprises an SDRAM having thirty-two planes of memory cell arrays 701 to 732. A general control processor 51 included in the control unit 5 has an address generating unit 52 that generates address signals ADR(RA, CA) for gaining access to the frame buffer memory 7. The address generating unit 52 gives a row address signal RA and a column address signal CA through an address bus AB to the frame buffer memory 7. The data to be accessed is sent through a pixel data bus PB to the frame buffer memory 7. The general control processor 51 gives a system clock signal $\phi$sc for controlling the generation of the address signals ADR to the address generating unit 52.

In operation, the general control processor 51 activates the address generating unit 52 according to a program stored beforehand. In response to the system clock signal $\phi$sc, the address generating unit 52 provides address signals ADR to gain access to the synchronous DRAM of the frame buffer memory 7. The address generating unit 52 generates a row address signal RA and a column address signal CA by the following method.

Figure 4:
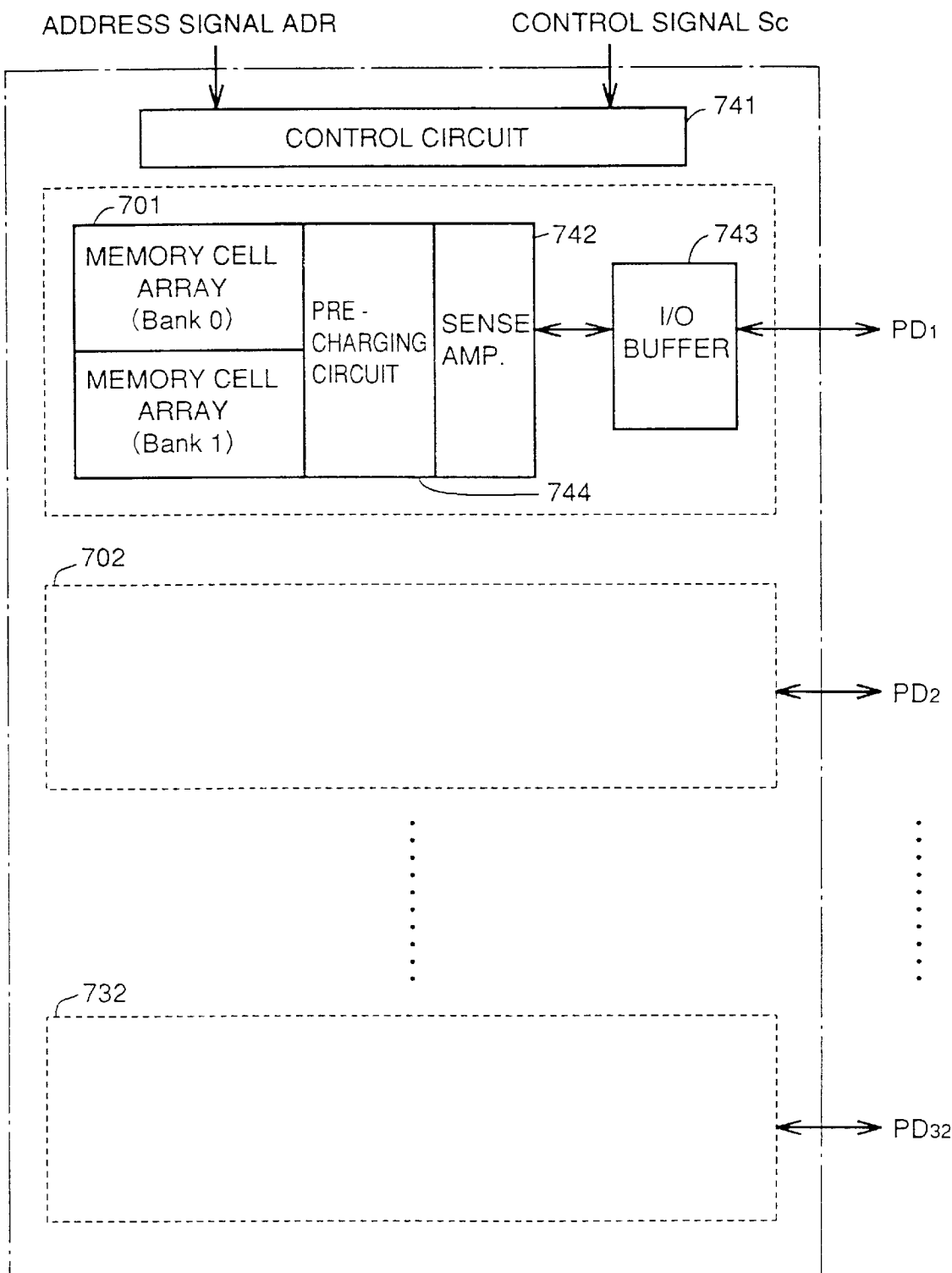
FIG. 4 is a block diagram of a frame buffer memory employing as synchronous DRAM.

Referring to FIG. 4 showing the frame buffer memory 7 employing a synchronous DRAM in a block diagram, the frame buffer memory 7 comprises a control circuit 741 and memory cell arrays 701 to 732. Each of the memory cell arrays 701 to 732 is divided into two banks, i.e., a Bank0 and a Bank1. A sense amplifier 742, an I/O buffer 743 and a precharging circuit 744 are combined with each of the memory cell arrays 701 to 732. While one of the banks Bank0 and Bank1 is in write operation, the precharging circuit 744 precharges the other. Data is written in the bank in write operation through the I/O buffer 743 and the sense amplifier 742. Thus, thirty-two bits of data PD1 to PD32 are written into or read from the memory cell arrays 701 to 732. Upon the reception of the address signals ADR and a control signal Sc, the control circuit 741 provides a control signal to gain access to the memory cell arrays 701 to 732.

Figure 5:
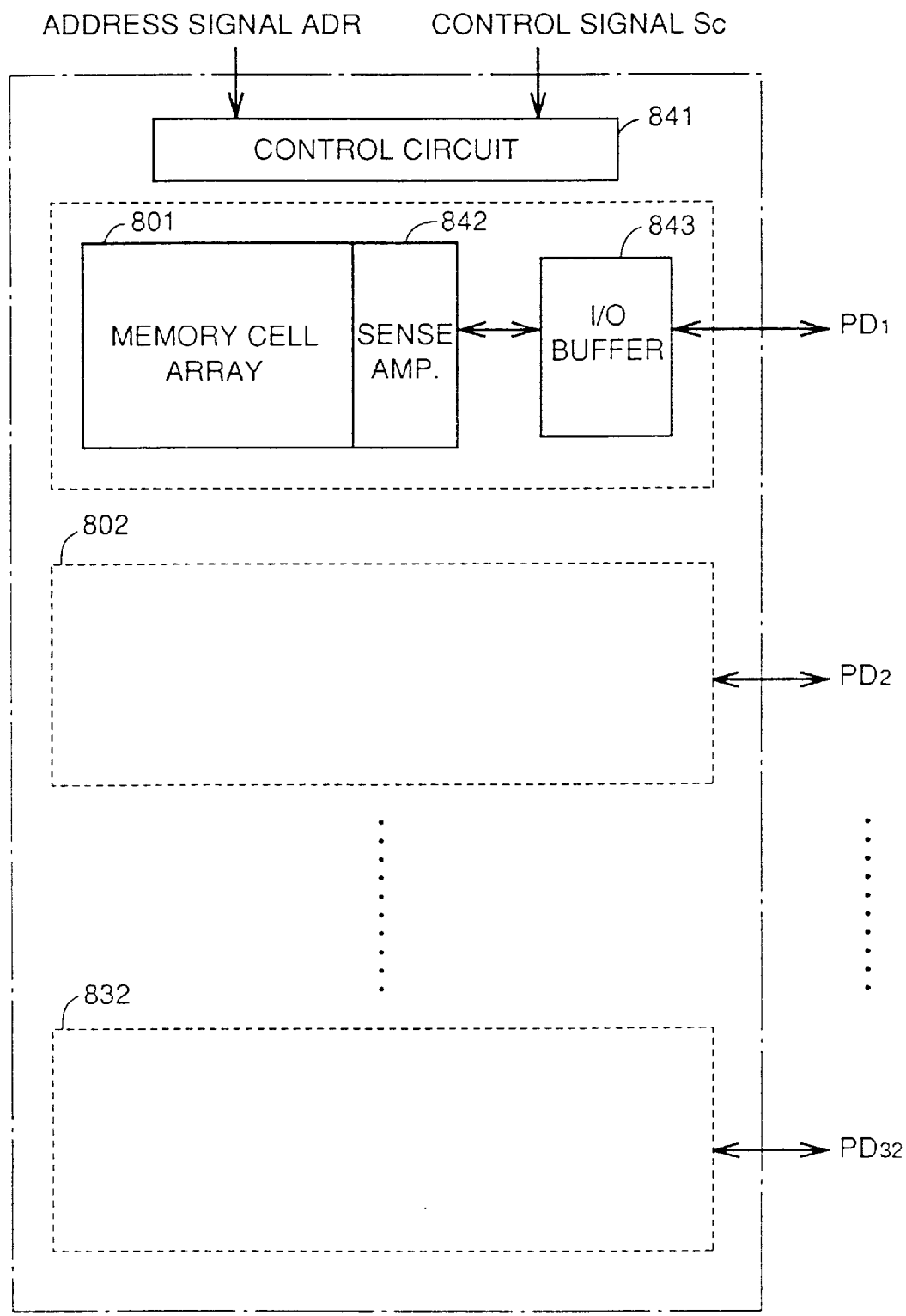
FIG. 5 is a block diagram of a frame buffer memory employing a DRAM.

FIG. 5 is a block diagram of a frame buffer memory comprising a DRAM. In this case, the memory cell array is a single memory cell array. This frame buffer memory functions similarly to the frame buffer memory comprising the synchronous DRAM by using each memory cell array as a bank.

Figure 6:
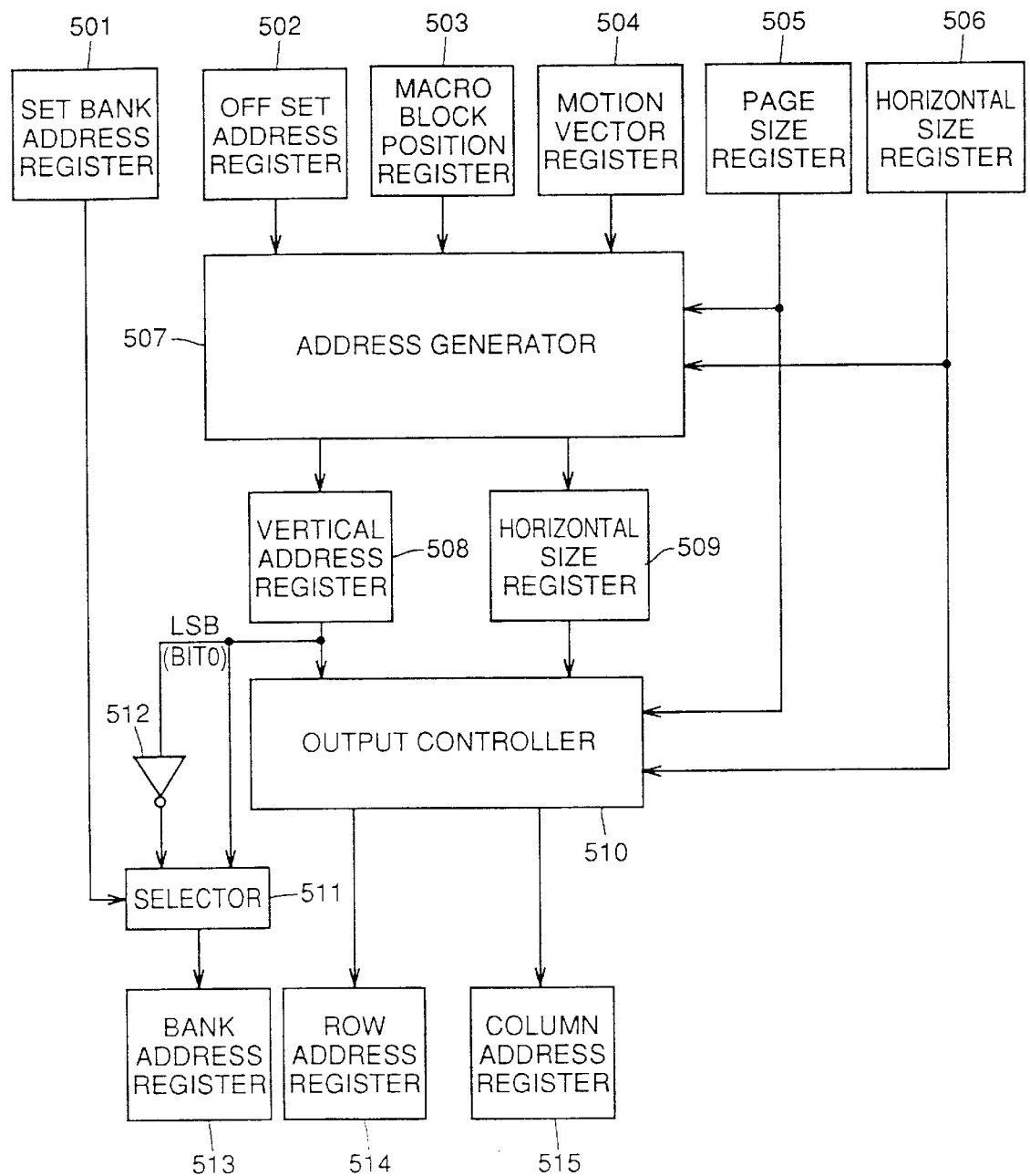
FIG. 6 is a block diagram of an address generating unit included in the frame buffer memory of FIG. 3.

The address generating unit 52 shown in FIG. 3 will be described in detail with reference to FIG. 6 showing the address generating unit 52 in a block diagram.

Referring to FIG. 6, the address generating unit 52 comprises a set bank address register 501, an offset address register 502, a macroblock position register 503, a motion vector register 504, a page size register 505, a horizontal size register 506, an address generator 507, a vertical address register 508, a horizontal address register 509, an output controller 510, a selector 511, an inverter 512, a bank address register 513, a row address register 514 and a column address register 515.

The address generator 507 receives an offset address from the address register 502, macroblock position data from the macroblock position register 503a, motion vector data from the motion vector register 504, page size data from the page size register 505, and horizontal size data of an image from the horizontal size register 506. Then, the address generator 507 generates a vertical address and a horizontal address on the basis of the input data, and stores the vertical address and the horizontal address in the vertical address register 508 and the horizontal address register 509, respectively. The output controller 510 receives the vertical address from the vertical address register 508, the horizontal address from the horizontal address register 509, the page size data of the memory from the page size register 505, and the horizontal size data of the image from the horizontal size register 506. Then, the output controller 510 generates a row address and a column address on the basis of the input data, stores the row address in the row address register 514, and stores the column address in the column address register 515. The selector 511 receives set bank address from the set bank address register 501, the least significant bit of the vertical address from the vertical address register 508, and the inverted least significant bit of the vertical address through the inverter 512 from the vertical address register 508. The selector 511 generates a bank address on the basis of the input data and stores the bank address in the bank address register 513.

Thus, the address generating unit 52 generates the row address, the column address, and the bank address for selecting a predetermined bank among the plurality of banks.

The image processing apparatus in this embodiment handles image data representing a rectangular transfer region having sixteen pixels or eight pixels along each of the vertical and the horizontal directions on the screen as one processing unit. Therefore, the rectangular transfer region consisting of sixteen pixels or eight pixels along each of the vertical and the horizontal direction is transferred in a unit and, consequently, the addresses can be easily generated by using the motion vector data to transfer the pixel data representing a predicted image region when two-dimensional addressing is performed for the components of the image including luminance and chrominance.

When the synchronous DRAM is employed in this embodiment, the synchronous DRAM is able to read or write data continuously in synchronism with a clock in an allowable range within the same row address. When writing data into different row addresses in the same bank, a plurality of cycles of precharging period is necessary between the writing of the last data into one row address and the writing of the first data into the next row address. However, when writing data into row address in the different banks, the writing of the first data into the row address of one bank and the writing of the first data into the row address of another bank performed continuously. When writing data again into the row address of the same bank, the synchronous DRAM is able to operate continuously if a plurality of cycles of precharging period have passed after the completion of writing the data into the same bank. When reading data, data can be continuously read from different row addresses regardless of the bank, if the time necessary for providing the data in response to one read command is not shorter than the minimum read cycle time of the synchronous DRAM.

Figure 7:
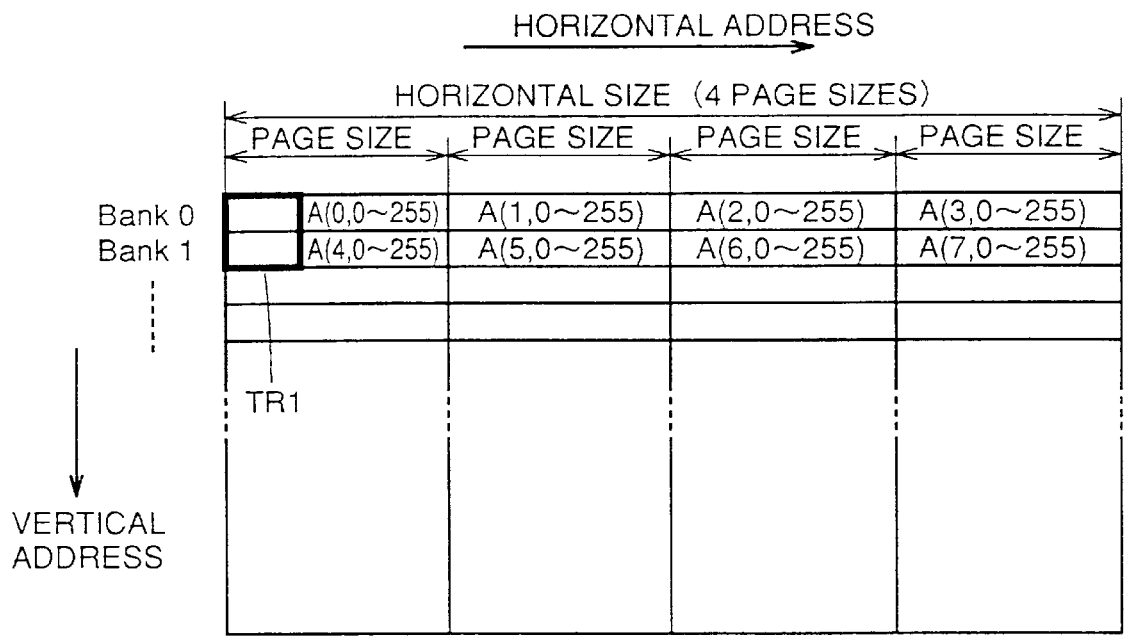
FIG. 7 is a view of assistance in explaining a first method of addressing the frame buffer memory shown in FIG. 1.

Methods of addressing the frame buffer memory utilizing the features of image coding and the synchronous DRAM will be described hereinafter. FIG. 7 is a view of assistance in explaining a first addressing method of addressing the frame buffer memory shown in FIG. 1.

The first addressing method illustrated in FIG. 7 stores four pixel data corresponding to four pixels along the vertical direction in a field, i.e., thirty-two bits of data, at a storage location specified by one row address and one column address. In FIG. 7, A(RA, CA) indicates a storage location specified by a row address RA and a column address CA. For example, A(0, 0 to 255) represents pixel data specified by a row address RA0 and column addresses CA0 to 255, i.e., pixel data representing an image consisting of four pixels along the vertical directions and 256 pixels along the horizontal directions.

The horizontal size of a field is four page sizes. The page size defines the range of column addresses in the synchronous DRAM. For example, when a column address is expressed by eight bits, the page size is 256 words. Therefore, along the horizontal direction in a field, an address space corresponding to four row addresses, i.e., four pages, is one data row. A two-dimensional address is formed on a field by horizontally stacking the data rows. Therefore, the row address is incremented by four row addresses for one data row with respect to the vertical direction in a field. For example, A(4, 0 to 255) underlies A(0, 0 to 255) and pixel data of row address RA4 is stored at a location under a location of row address RA0. The address of the bank is changed for every four row addresses (one vertical address on the screen) in the frame buffer memory; that is, pixel data on the uppermost data row is stored in the bank Bank0, and pixel data on the next data row is stored in the bank Bank1. Thus, successive data rows are stored alternately in the banks Bank0 and Bank1.

When pixel data are allocated to locations of the frame buffer memory by the first addressing method, the pixel data are transferred, for example, in a unit of a rectangular transfer region TR1.

Figure 8:
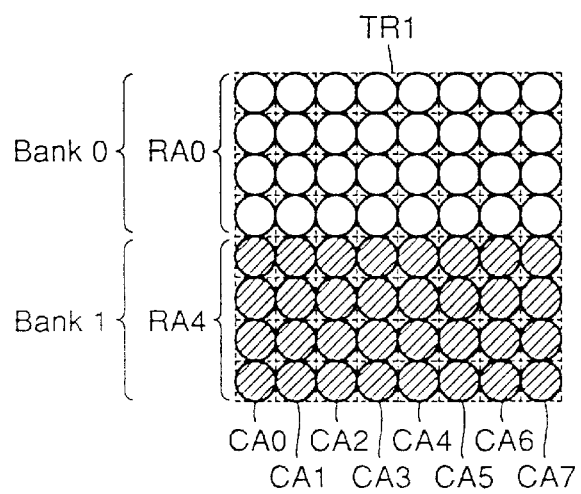
FIG. 8 is an enlarged view of a rectangular transfer region shown in FIG. 7.

Referring to FIG. 8 showing the rectangular transfer region TR1 shown in FIG. 7 in an enlarged view, the rectangular transfer region TR1 is a pixel data block of eight pixel data along the horizontal direction and eight pixel data along the vertical direction in the two-dimensional address space. For example, the pixel data specified by a row address RA0 and a column address CA0 are four pixel data along the vertical direction. The four pixel data are transferred simultaneously in one data block. Pixel data on four rows are specified by one row address, for example, a row address RA0, the column address is incremented for each pixel with respect to the horizontal direction and, for example, the column address of the left end pixel data is CA0 and the column address is incremented by one for each pixel data and the successive pixel data are specified by column addresses CA1, CA2, . . . and CA7. Pixel data on the upper four rows, i.e., pixel data represented by blank circles, are stored in the bank Bank0, and pixel data on the lower four rows, i.e., pixel data represented by shaded circles, are stored in the bank Bank1. Therefore, when writing the pixel data in the rectangular transfer region TR1 shown in FIG. 8 into the frame buffer memory, the bank Bank0 is precharged while the pixel data is being written into the bank Bank0. Ordinarily, the precharge time is shorter than the write time and hence the precharging operation for precharging the bank Bank1 is completed before the writing operation for writing the pixel data into the bank Bank0 is completed. Therefore, four pixel data can be written in a unit continuously into the bank Bank0 by specifying the row address RA0 and sequentially specifying the column addresses CA0 to CA7. Since the precharging operation for precharging the bank Bank1 is completed during the writing operation, the writing operation for writing the pixel data into the bank Bank1 can be started upon the completion the writing operation for writing the pixel data into the bank Bank0; that is, four pixel data can be continuously written into the bank Bank1 by specifying the row address RA4 and the bank Bank1 and sequentially specifying the column addresses CA0 to CA7. Accordingly, one of the banks Bank0 and Bank1 can be precharged while the pixel data is being written into the other by sequentially writing the pixel data specified by the successive row addresses alternately into the banks Bank0 and Bank1, so that the data transfer time can be reduced.

A second addressing method to be carried out when the frame buffer memory is a frame buffer memory having eight planes will be described with reference to FIG. 9. When the frame buffer memory has eight planes, eight bits of data are specified by one row address and one column address. Therefore, one pixel data representing one pixel can be written or read by specifying one row address and one column address.

Figure 9:
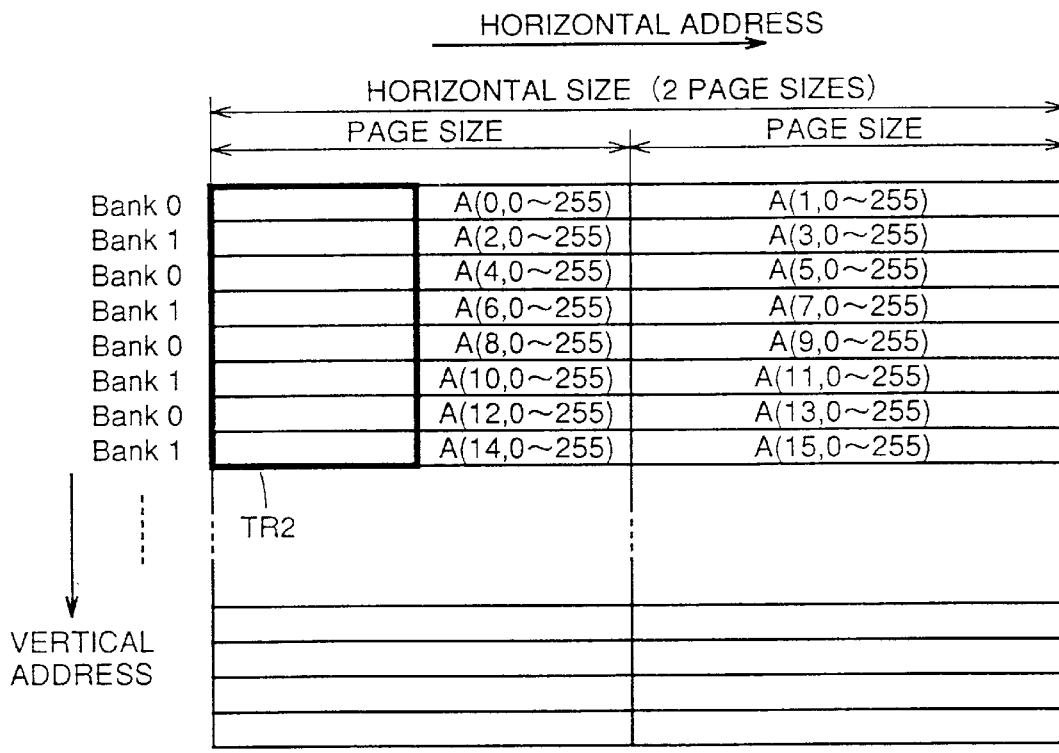
FIG. 9 is a view of assistance in explaining a second method of addressing the frame buffer memory shown in FIG. 1.

Referring to FIG. 9, one pixel data (eight bits of data) representing one pixel is stored at a location in the frame buffer memory specified by one row address and one column address. The horizontal size of the field corresponds to, for example, the size of two pages. Therefore, if a column address is expressed by eight bits, the column addresses of the frame buffer memory are 0 to 255 and the page size is 256 words. One data row is defined by an address space corresponding to one horizontal size. In FIG. 9, since the horizontal size is equal to two pages, an address space corresponding to two row addresses, i.e., two pages, is one data row with respect to the horizontal direction in the field. In the frame buffer memory, data rows are stacked vertically to form a two-dimensional address. Therefore, the row address is incremented by two row addresses for one data row with respect to the vertical direction. For example, the address of pixel data underlying pixel data represented by an address A(0, 0 to 255) is A(2, 0 to 255). In the frame buffer memory, the bank address is changed for every two addresses (one vertical address in the field). In the two-dimensional address space, pixel data are transferred in a unit of a rectangular transfer region TR2 consisting of eight vertically arranged pixels and eight horizontally arranged pixels.

Figure 10:
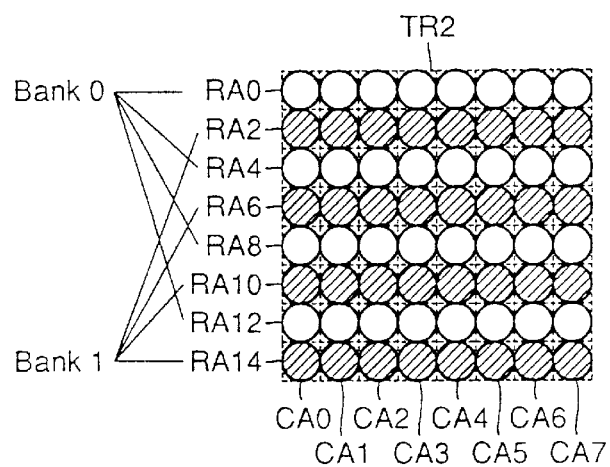
FIG. 10 is an enlarged view of a rectangular transfer region shown in FIG. 9.

FIG. 10 is an enlarged view of the rectangular transfer region TR2 shown in FIG. 9. Referring to FIG. 10, one row address and one column address are assigned to each pixel data. For example, the pixel data in the upper left-hand corner is specified by a row address RA0 and a column address CA0. The column addresses of pixel data on each row are increased sequentially to the right such that the column address of one pixel data is greater by one than the column address of the adjacent pixel data on the left side thereof. For example, the pixel data on the right side of the pixel data specified by the row address RA0 and the column address CA0 is specified by the row address RA0 and a column address CA1. The row addresses of pixel data on each column are increased sequentially downward such that the row address of one pixel data is greater by two than the row address of a pixel data immediately on the upper side thereof For example, a pixel data immediately under a pixel data specified by the row address RA0 and the column address CA0 is specified by a row address RA2 and the column address CA0. Therefore, the eight pixel data in each row are specified by the same row address. The bank is charged for eight pixel data on each row; for example, the pixel data specified by the row addresses RA0, RA4, RA8 and RA12 are stored in a bank Bank0, and the pixel data specified by the row addresses RA2, RA6, RA10 and RA14 are stored in a bank Bank1. Therefore, while the eight pixel data on one row are being written, the eight pixel data on a row underlying the former row can be precharged. Consequently, a write operation and a precharging operation can be concurrently carried out and hence the data transfer time can be reduced.

Each of the aforesaid addressing methods writes the eight or sixteen pixel data arranged along one direction, i.e., on each row or each column, into one page, and one page of the frame buffer memory has an address space defined by the nth power of two. Therefore, the division of the pixel data coincides with that of pages and hence the pixel data are not written continuously into tow successive pages of the same bank address. Consequently, image data can be continuously written to transfer the pixel data at a high data transfer rate.

Figure 11:
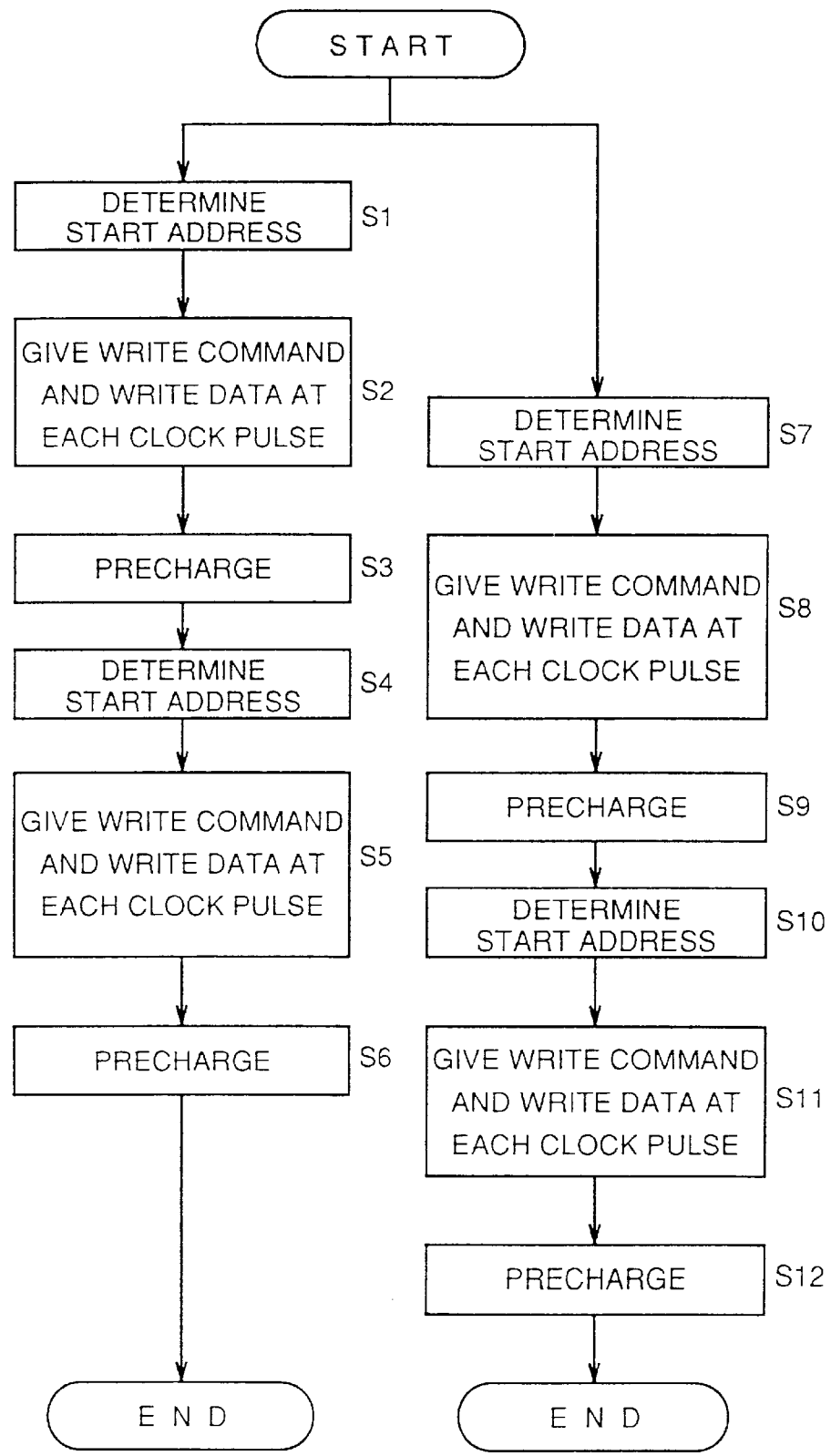
FIG. 11 is a flow chart of a first write procedure for writing data into the frame buffer memory shown in FIG. 1.

Write operations by the foregoing addressing methods for writing pixel data into the frame buffer memory will be described hereinafter. FIG. 11 is a flow chart of a first write operation for writing pixel data into the frame buffer memory 7 included in the image processing apparatus shown in FIG. 1 by using the first addressing method previously described with reference to FIGS. 7 and 8. In FIG. 11, steps S1 to S6 are those of an operation for the bank Bank0, and steps S7 to S12 are those of an operation for the bank Bank1. Steps arranged side by side are executed concurrently for the banks Bank0 and Bank1, respectively; for example, steps S3 and S4, and step S8 are executed concurrently.

In step S1, a start address is determined; that is, in a bank Bank0, a row address RA0 is assigned to the thirty-two pixel data in the upper half of the rectangular transfer region TR1 shown in FIG. 8.

In step S2, a write command is given and pixel data is written in synchronism with the clock. For example, the write command is given at the time when a column address is determined and the four pixel data in the left end column of the rectangular transfer region TR1 shown in FIG. 8 are written into the bank Bank0. Subsequently, the columns each of the four pixel data are written sequentially from left to right in the bank Bank0 in synchronism with the clock. Meanwhile, a start address is determined in step S7; for example, in the bank Bank1, a row address RA4 is assigned to the thirty-two pixel data in the lower half of the rectangular transfer region TR1 shown in FIG. 8.

In step S8, in the bank Bank1, a write command is given and the pixel data are written in synchronism with the clock. For example, the four pixel data in the upper half of the right end column are written, and then a column address CA0 and a write command for writing pixel data in the bank Bank1 are determined in the next cycle, and then the four pixel data in the lower half of the left end column are written into the bank Bank1. Subsequently, the pixel data in the lower half of the rectangular transfer region TR1 shown in FIG. 8 are written sequentially from left to right in the bank Bank1 in synchronism with the clock. Meanwhile, a precharging operation is performed in step S3 for the bank Bank0. For example, while the write operation is being performed for the bank Bank1, the precharging operation is performed for the bank Bank0.

When the write operation is to be continued for the bank Bank0, a start address is determined in step S4. For example, a row address is assigned to the four pixel data in the left end column in a rectangular transfer region underlying the rectangular transfer region TR1 shown in FIG. 7. Steps S4 and S8 are executed concurrently.

Then, the same operations as those in step S2 and S3 are executed in steps S5 and S6, respectively, the same operations as those executed in steps S3 and S4 are executed in steps S9 and S10 for the bank Bank1 concurrently with the operation in step S5. Steps S11 and S6 are executed concurrently, and then step S12 is executed. Thus, in the frame buffer memory of the image processing apparatus in this embodiment, the precharging operation and the start address determining operation are performed for one of the banks while the write operation is performed for the other. Therefore, only the time necessary for completing the write operation is necessary for continuously reading out the pixel data representing successive pixels on the screen and hence the pixel data can be transferred at a high data transfer rate.

Figure 12:
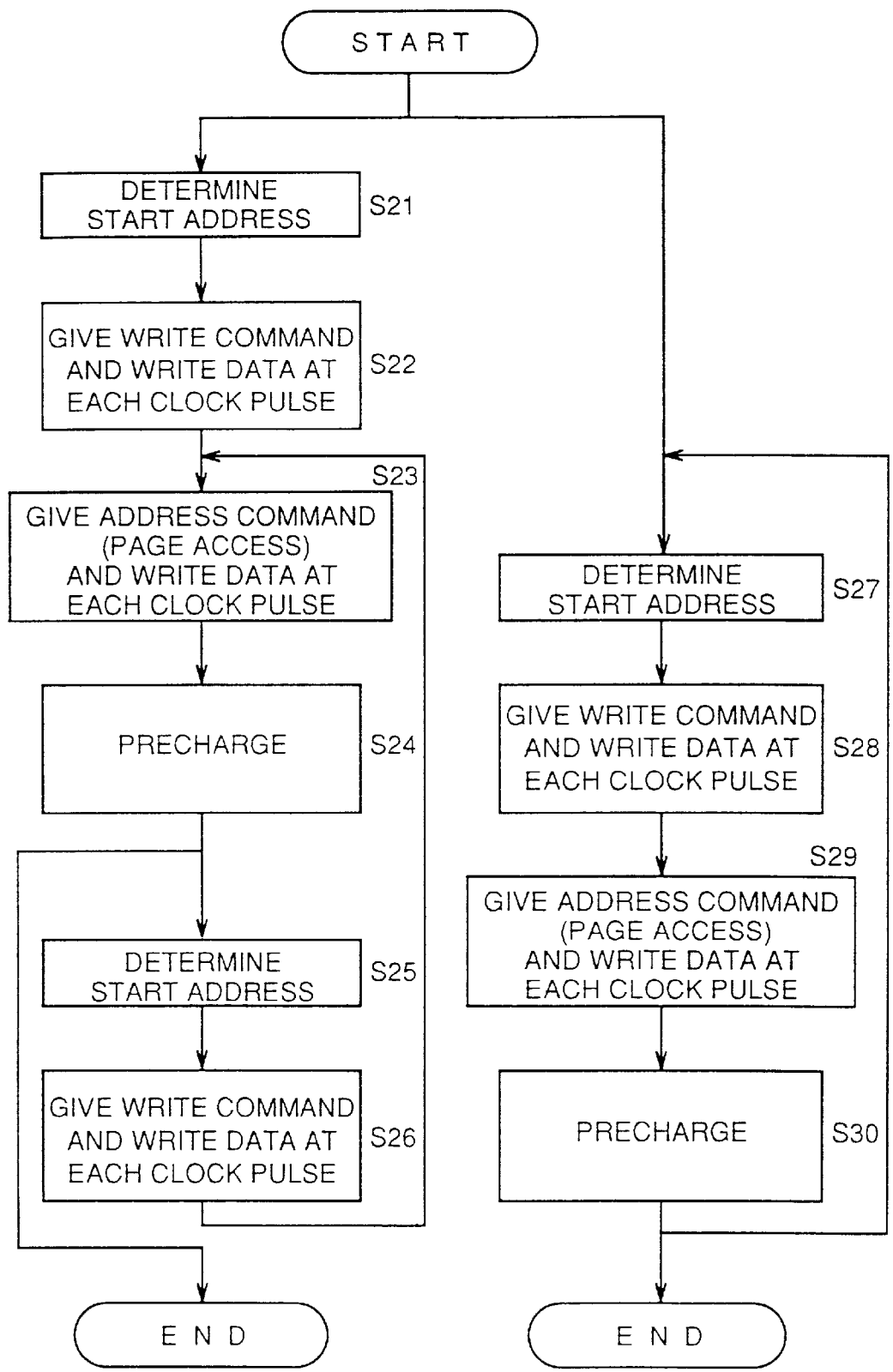
FIG. 12 is a flow chart of a second write procedure for writing data into the frame buffer memory shown in FIG. 1.

A second write operation for writing pixel data into the frame buffer memory will be described hereinafter. The second write operation writes pixel data into the frame buffer memory in the page mode, which is a mode in which one row address is specified and then, column address is changed SDRAM to read or write pixel data continuously. FIG. 12 is a flow chart of assistance in explaining the second write operation (a write operation in the page mode) for writing pixel data into the frame buffer memory 7 included in the image processing apparatus shown in FIG. 1. Steps S21 to S26 are operations for writing pixel data into the bank Bank0, and steps S27 to S30 are operations for writing pixel data into the bank Bank1. Steps arranged side by side are execute concurrently for the banks Bank0 and Bank1, respectively; for example, steps S24 and S28 are executed con currently.

Referring to FIG. 12, a start address is determined in step S21 by the same operation as that performed in step S1 (FIG. 11). In step S22, a write command is given and pixel data are written in synchronism with a clock by the same operation as that performed in step S2 (FIG. 11).

In step S23, an address command is given for page access, and then pixel data are written sequentially in synchronism with the clock and, at the same time, a start address is determined in step S27 for the bank Bank1.

In step S24, the precharging operation is executed and the procedure is ended if access to the next page is unnecessary or the program goes to step S25 if access to the next page is necessary Step S28 is executed in response to each write command concurrently with step S24 to write pixel data into the bank Bank1 in synchronism with the clock.

In step S29, an address command is given for the bank Bank1, and then pixel data are written sequentially in synchronism with the clock. Meanwhile, a start address is determined in step S25 for the bank Bank0 when access to the next page is necessary.

In step S30, a precharging operation is executed for the bank Bank1. The program returns to step S2 to repeat the following steps after the precharging opera ion has been completed when access to the next page is necessary or the program is ended if access to the next page is unnecessary. Meanwhile, a write command is given and pixel data are written into the bank Bank0 in synchronism with the clock in step S26. After the pixel data have been written, the program returns to step S23 to repeat the following steps.

Thus, the operations for determining the write command and for writing the pixel data in synchronism with the clock and the precharging operation are executed concurrently, and the operations for giving the address command and writing the pixel data in synchronism with the clock and the operation for determining the start address are performed concurrently also in the page mode, the pixel data can be continuously written into the frame buffer memory at a high rate and hence the pixel data can be transferred at a high data transfer rate.

The effect of this embodiment in reducing the write time will be described with reference to FIGS. 13(a) to 13(c).

Figure 13:
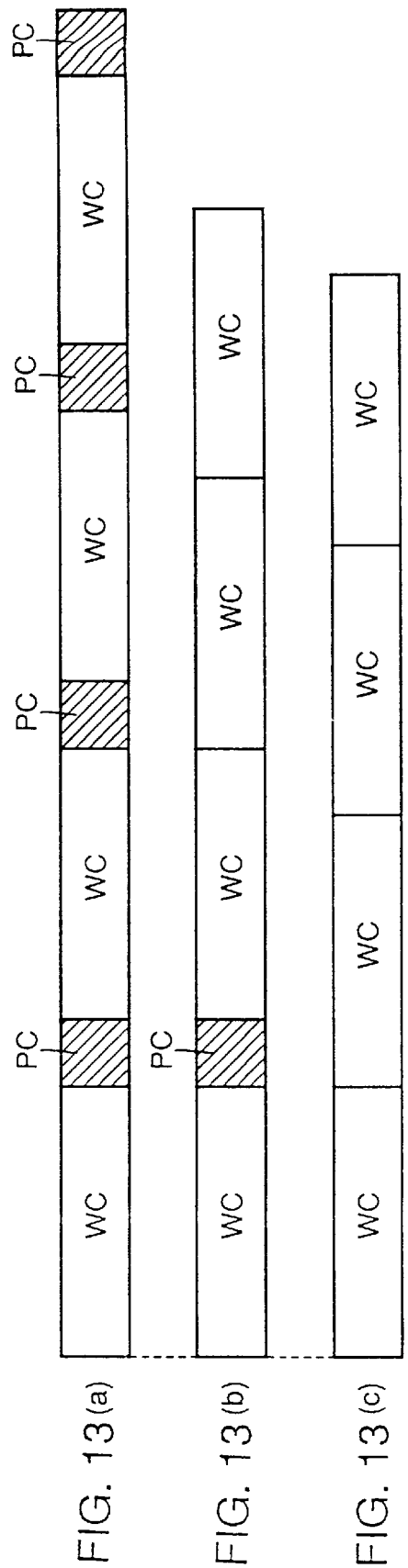
FIGS. 13(a), 13(b) and 13(c) are diagrammatic views of assistance in explaining the effect of the image processing apparatus in reducing the write time.

Referring to FIG. 13, when the write operation and the precharging operation are not performed con currently, a precharge cycle PC is carried out after a write cycle WC as shown in FIGS. 13(a) and 13(b). Therefore, the write time is extended every time the precharge cycle PC is carried out. On the other hand, since the image processing apparatus in this embodiment carries out the write operation and the precharging operation concurrently, no precharge cycle PC is inserted between the write cycles WC, and the write cycle WC are repeated successively as shown in FIG. 13(c). The write time is reduced by the cycle time of the precharge cycle, and the pixel data can be transferred at a high data transfer rate in the write time.

In this embodiment, the pixel data can be stored in blocks in the address space defined by the nth power of two and the pixel data can be stored in an address region smaller than the page size of the frame buffer memory so that the pixel data can be continuously writter at any time; that is, the size of a macroblock, which is one processing unit in a moving image coding process, is equal to that of the rectangular transfer region TR1 (FIG. 7) or TR2 (FIG. 9). Therefore, a processing unit for the luminance signal corresponds to a region of sixteen pixels in each row and sixteen pixels in each column, a processing unit for the chrominance signal corresponds to a region of eight pixels in each row and eight pixels in each column, a region of eight pixels in each row and sixteen pixels in each column, or a region of sixteen pixels in each row and sixteen pixels in each column. In either case, the address space can be defined by the nth power of two. Therefore, access is not gained successively to the two row addresses in the same bank when the present invention is applied to the page address of a general-purpose memory defined by the nth power of two and, consequently, concurrent execution of the precharging operation and the write operation is always possible and hence the pixel data can be transferred at a high data transfer rate.

Although the foregoing embodiment has been described as applied to the image processing apparatus having the frame buffer memory having two banks, the present invention is applicable also to an image processing apparatus having a frame buffer memory having three or more banks. Although the embodiment has been described as applied to handling pixel data of a field, the present invention is applicable also to handling pixel data of a frame.

A third addressing method of addressing the frame buffer memory 7 included in the image processing apparatus shown in FIG. 1 will be described with reference to FIGS. 14 to 16.

Figures 14, 15:
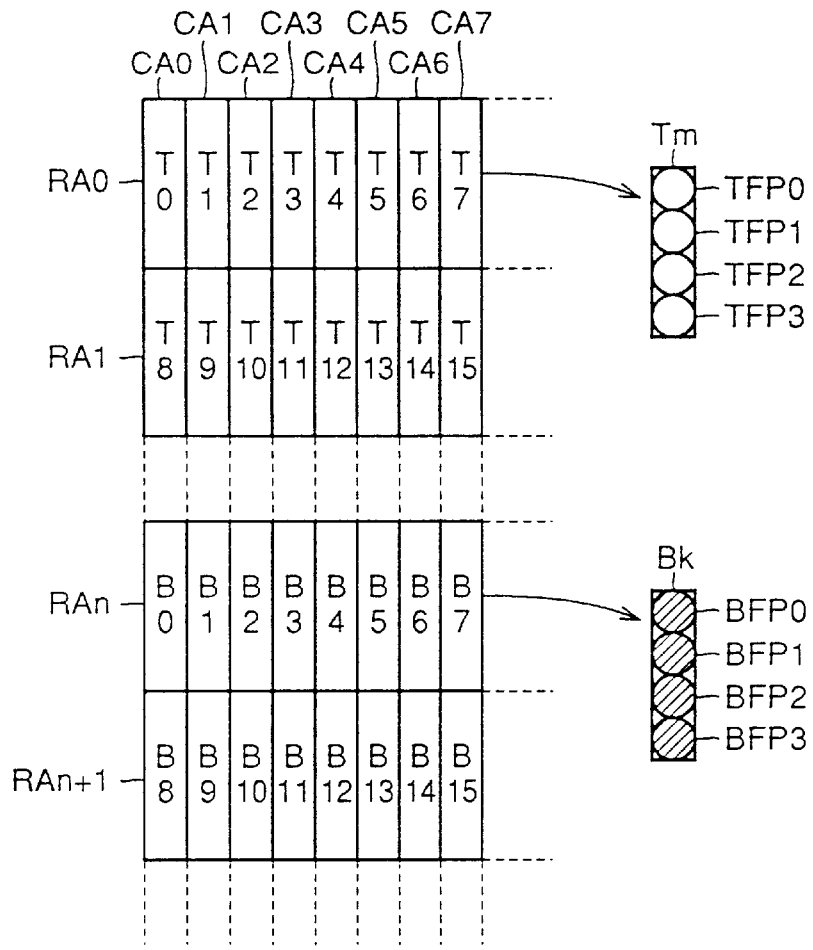
FIG. 14 is a first view of assistance in explaining a third method of addressing the frame buffer memory shown in FIG. 1.
FIG. 15 is a second view of assistance in explaining the third method of addressing the frame buffer memory shown in FIG. 1.

Referring to FIG. 14, four pixel data (32-bit data) corresponding to four pixels arranged along the vertical direction on a screen are stored at a location specified by one row address and one column address. Pixel data of the top field is stored in data blocks T0 to T15, and four pixel data TFP0 to TFP3 of the top field are stored in a vertical arrangement as indicated at Tm in each of the data blocks. Pixel data of the bottom field are stored in data blocks B0 to B15. Four pixel data BFP0 to BFP3 of the bottom field are stored as indicated at Bk in each of the data blocks B0 to B15. One location specified by one row address and one column address is allocated to each of the data blocks T0 to T15 and B0 to B15. For example, the data block T0 is specified by a row address RA0 and a column address CA0, and the data block B0 is specified by a row address RAn and a column address CA0.

The frame buffer memory addressed by the third addressing method, similarly to the frame buffer memory addressed by the first addressing method, is able to transfer the data blocks each of the four pixel data sequentially. Therefore, when data of the frame structure are necessary, pixel data as shown in FIG. 15 can be transferred by transferring the pixel data of the data blocks T0 to T7 and those of the data blocks B0 to B7. In this case, the pixel data of the top field and those of the bottom field necessary for the frame structure are transferred, and hence a region necessary for image processing coincides with a region to be transferred. On the other hand, when data of the field structure are necessary, for example, when pixel data of the top field is necessary, the pixel data of the data blocks T0 to T15 are transferred as shown in FIG. 16. In this case, pixel data to be transferred are only those in the top field and unnecessary pixel data in the bottom field are not transferred. Thus, the region necessary for image processing coincides with the region to be transferred also when the pixel data of the field structure are subjected to image processing. Accordingly, the third addressing method enables the transfer of only the necessary pixel data of the frame structure or only the necessary pixel data of the field structure in a reduced number of transfer cycles and hence the pixel data can be transferred at a high data transfer rate. Since unnecessary pixel data are not transferred, the buffer memory for storing the transferred pixel data may be such as having the least necessary storage capacity.

As mentioned above, the third addressing method divides a plurality of vertically arranged pixel data into those of two fields in transferring the plurality of vertically arranged pixel data in a block, forms one data region by the pixel data of each field and is able to transfer the pixel data of the data region. Therefore, only the pixel data of necessary regions can be transferred regardless of the image structure at a high data transfer rate.

Although each of the foregoing addressing methods assigns row addresses to the pixel data in rows and column addresses to those in columns, the row addresses may be assigned to the pixel data in columns and the column addresses may be assigned to those in rows for the same effect.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising storage means for storing pixel data arranged in a matrix manner to form screen data, wherein said pixel data represents a corresponding pixel with one set of bits per pixel, said screen data includes at least two sets of field data, each being subjected to a predetermined processing by each of a plurality of data blocks including a first number of said pixel data in n rows (n is an integer), said storage leans includes a plurality of banks, each storing at least said first number of said pixel data successively without a precharging operation while one row address is being designated, each of said banks including n×1 memory planes, (where 1 is an interger) each having an address space with identical addresses, and precharging means for precharging each of said plurality of banks individually;

said storage means stores said each of the plurality of data blocks belonging to one of said sets of field data in a bank different from a bank corresponding to another of said sets of field data and assigns an identical address to pixel data corresponding to n pixels adjacent in the column direction of said each data block, said precharging means precharges one of said plurality of banks while another of said plurality of banks is being subjected to a write operation.

2. An image processing apparatus comprising storage means for storing pixel data arranged in a matrix manner to form screen data, wherein said pixel data represents a corresponding pixel with one set of bits per pixel, said screen data includes at least two sets of field data, each being subjected to a predetermined processing by each of a plurality of data blocks including a first number of said pixel data in n rows (n is an integer), said storage means includes a plurality of banks, each storing at least a second number of said pixel data successively without precharging operation while one row address is being designated, each of said banks including m×1 memory planes (where m and 1 are integers respectively), each having an address space with identical addresses, and precharging means for precharging each of said plurality of banks individually;

said each of the plurality of data blocks is divided into data subblocks, each including said second number of said pixel data in m rows, said storage means stores said each of the plurality of data blocks belonging to one of said sets of field data by each said data subblock in a bank different from a bank corresponding to another of said sets of field data and assigns an identical address to pixel data corresponding to m pixels adjacent in the column direction of each said data subblock, and said precharging means precharges one of said plurality of banks while another of said plurality of banks is being subjected to a write operation.

3. An image processing apparatus according to claim 2, wherein
said plurality of banks are two banks, and said image processing apparatus further comprises:
an address generator that generates vertical and horizontal addresses of said screen data, and
selecting means for selecting one of the two banks according to the least significant bit of a vertical address generated by the address generator.

4. An image processing apparatus according to claim 3, wherein
said storage means includes a synchronous dynamic random access memory, and the synchronous dynamic random access memory stores the pixel data in a page mode.

5. An image processing apparatus according to claim 2, wherein
said n rows of pixel data correspond to eight adjacent rows of pixels horizontally arranged in said field screen data,
said m rows of pixel data correspond to four adjacent pixels vertically arranged among said n rows of pixels, and
said storage means transfers the pixel data in blocks each of eight horizontally arranged pixel data and eight vertically arranged pixel data.

6. An image processing apparatus according to claim 2, wherein
said n rows of pixel data correspond to eight rows of horizontally arranged pixels in said field screen,
said m rows of pixel data correspond to a pixel among said one row of pixels, and
said storage means transfers the pixel data in blocks each of eight horizontally arranged pixel data and eight vertically arranged pixel data.

7. An image processing apparatus according to claim 2, wherein
said plurality of banks include a first and a second bank,
a write command is given and data is written into said second bank in synchronism with a predetermined clock while said first bank is being subjected to a precharging operation and a start address is determined, and
said second bank is subjected to a precharging operation and a start address is determined while a write command is given and data is being written into said first bank in synchronism with said predetermined clock.

8. An image processing apparatus according to claim 2, wherein
said storage means stores the pixel data in a page mode,
said plurality of banks include a first and a second bank,
a starting address is determined for said second bank while an address command is given for said first bank for page access and data is being written into said first bank in synchronism with said predetermined clock,
a write command is given for said second bank and data is written into said second bank in synchronism with said predetermined clock while said first bank is being subjected to a precharging operation,
an address command is given for said second bank for page access and data is written into said second bank in synchronism with said predetermined clock while a start address is determined for said first bank, and
said second bank is subjected to a precharging operation while a write command is given for said first bank and data is being written into said first bank in synchronism with said predetermined clock.

9. An image processing apparatus according to claim 2, wherein
the storage means includes a frame buffer memory,
said image processing apparatus further comprises:
a pixel processing unit that processes image using predetermined macroblocks as processing units, and
a pixel data bus through which pixel data are transferred between said frame buffer memory and said pixel processing unit; and
pixel data are transferred in macroblocks from said frame buffer memory to said pixel processing unit.

10. An image processing apparatus according to claim 2, wherein
said n rows of pixel data correspond to eight rows of pixels horizontally arranged in a field screen,
said m rows of pixel data correspond to one row of pixels and
said storage means transfers said data blocks each of eight horizontally arranged pixel data and eight vertically arranged pixel data.

11. An image processing apparatus comprising storage means for storing pixel data arranged in a matrix manner to form screen data, wherein
said pixel data represents a corresponding pixel with one set of bits per pixel,
said screen data includes at least two sets of field data, each being subjected to a predetermined processing by each of a plurality of n×n data blocks corresponding to said pixel data of adjacent n rows and adjacent n columns (n is an integer), said storage means includes
a plurality of banks, each storing said pixel data of at least m rows (m is an integer) and n columns successively without precharging operation while one row address is being designated,
each of said banks including m×1 memory planes, (m and 1 are intergers, respectively) each having an address space with identical addresses, and
precharging means for precharging each of said plurality of banks individually;
said each of the plurality of n×n data blocks is divided into m×n data subblocks, each corresponding to said pixel data of adjacent m rows and adjacent n columns,
said storage means stores each of the plurality of n×n data blocks belonging to one of said sets of field data by each said m×n data subblock in a bank different from a bank corresponding to another of said sets of field data and assigns an identical address to pixel data corresponding to m pixels adjacent in the column direction of each said data subblock,
said precharging means precharges one of said plurality of banks while another bank is being subjected to a write operation.

12. An image processing apparatus according to claim 11, wherein said plurality of banks are two banks,
said image processing further comprises:
an address generator that generates vertical and horizontal addresses of said screen data, and
selecting means for selecting one of said two banks according to the least significant bit of the vertical address generated by said address generator.

13. An image processing apparatus according to claim 12, wherein
said storage means includes a synchronous dynamic random access memory, and said synchronous dynamic random access memory stores a pixel data in the page mode.

14. An image processing apparatus according to claim 11, wherein said plurality of banks are first and second banks, a write command is given for said second bank and data is written into said second bank in synchronism with a predetermined clock while said first bank is subjected to a precharging operation and a start address is determined for said first bank, and said second bank is subjected to a precharging operation and a start address is determined for said second bank while a write command is given for said first bank and data is being written into said first bank in synchronism with said predetermined clock.

15. An image processing apparatus according to claim 11, wherein said storage means stores the pixel data in the page mode, said plurality of banks are first and second banks, a start address is determined for said second bank while an address command is given for said first bank for page access and data is being written into said first bank in synchronism with a predetermined clock, a write command is given for said second bank and data is written into said second bank in synchronism with said predetermined clock while said first bank is being subjected to a precharging operation, an address command is given for said second bank for page access and data is written into said second bank in synchronism with said predetermined clock while a start address is determined for said first bank, and said second bank is subjected to a precharging operation while a write command is given for said first bank and data is being written into said first bank in synchronism with said predetermined clock.

16. An image processing apparatus according to claim 11, wherein said storage means includes a frame buffer memory;

said image processing apparatus further comprising:

a pixel processing unit that processes an image in predetermined macroblocks as processing units; and a pixel data bus through which pixel data are transferred between said frame buffer memory and said pixel processing unit; and wherein pixel data are transferred in macroblocks from said frame buffer memory to said pixel processing unit.

* * * * *